United States Patent [19]
Aubert

[11] 3,773,616
[45] Nov. 20, 1973

[54] NUCLEAR REACTOR COMPRISING A CORE COVER

[75] Inventor: Michel Aubert, Fontenay-Aux-Roses, France

[73] Assignee: Commissariat A L'Energie Atomique, Paris, France

[22] Filed: Oct. 13, 1971

[21] Appl. No.: 188,813

[30] Foreign Application Priority Data
Oct. 15, 1970 France .............................. 7037310

[52] U.S. Cl. .................................... 176/30, 176/87
[51] Int. Cl. ............................................. G21c 19/20
[58] Field of Search ................... 176/30, 31, 32, 87

[56] References Cited
UNITED STATES PATENTS
3,044,947  7/1962  Payne, Jr. ......................... 176/30 X
3,104,217  9/1963  Long .................................... 176/30
3,354,040  11/1967  Frame et al. ....................... 176/30 X FOREIGN PATENTS OR APPLICATIONS
1,059,120  6/1959  Germany ............................. 176/30
6,612,132  1/1967  Netherlands .......................... 176/30

Primary Examiner—Carl D. Quarforth
Assistant Examiner—E. E. Lehmann
Attorney—William B. Kerkam, Jr.

[57] ABSTRACT

A core cover is carried by an inner rotating shield plug which is mounted in eccentric relation to an outer rotating shield plug and is smaller in diameter than the outer plug and the reactor core. The cover forms above the core a lateral projection with respect to the inner plug. The rotation of the inner plug about its own axis is intended to free part of the reactor core so as to permit handling of fuel assemblies within the core by means of an articulated handling arm which is carried by the outer plug.

5 Claims, 1 Drawing Figure

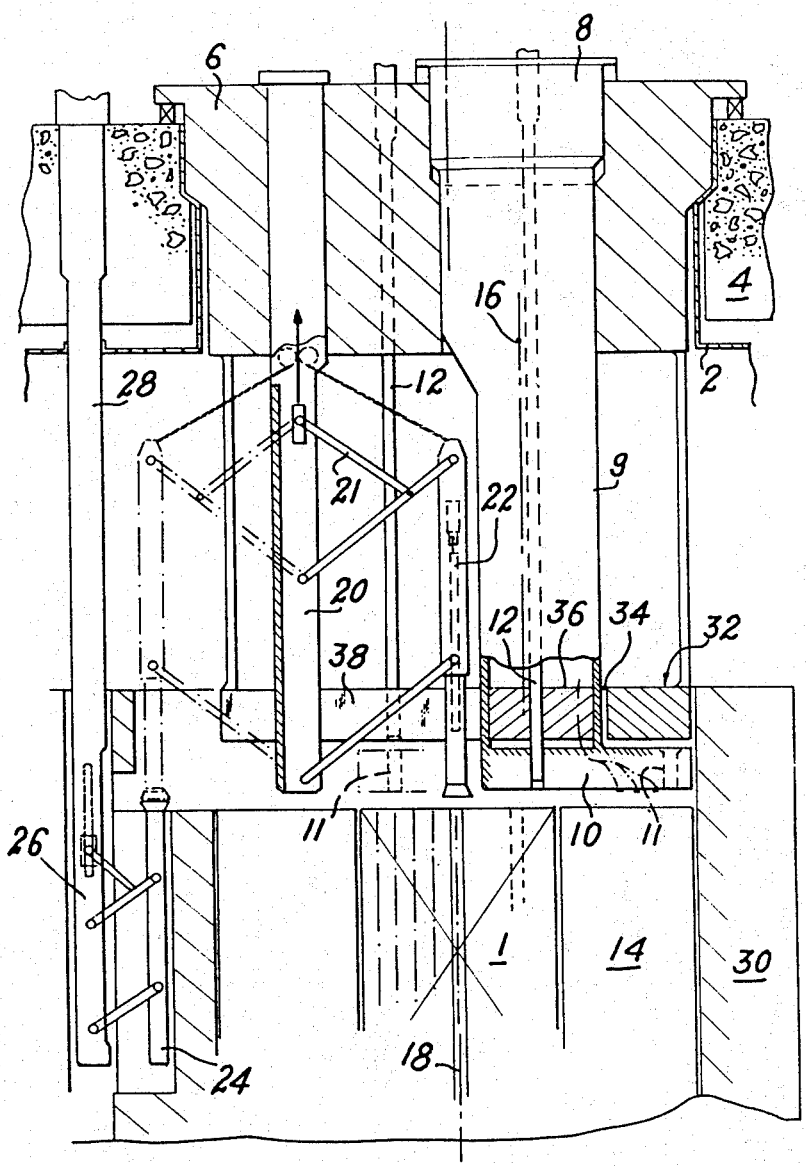

NUCLEAR REACTOR COMPRISING A CORE COVER

This invention relates to nuclear reactors, especially of the type comprising a core cover.

In some nuclear reactors and particularly those in the fast-neutron energy range, provision is usually made above the top portion of the reactor-core fuel assemblies for a structure which is referred-to as a "core cover" and supports instruments such as thermocouples, ebullition detectors, burst-can locating devices and the like, these different instruments being provided with extensions through a top sealing slab of the biological shield of vault which surrounds the reactor and being connected to external measuring and monitoring devices. In particular, a structure of this type must extend over the entire top surface of the reactor core since the majority of these instruments such as the thermocouples must correspond in number to the fuel assemblies and must be placed in vertically opposite relation to each of these latter. It must also be possible by means of this structure to gain access to the fuel assemblies which are contained in the reactor core, particularly for refuelling purposes. The structure must consequently be movable in order to free the top portion of the reactor core and thus make it possible to carry out the corresponding handling operations.

The core cover is therefore usually supported by part of a first rotating shield plug which is mounted eccentrically with respect to the reactor core in order that it may be located above a free space between the core and a containment vessel. Rotation of said plug permits lateral withdrawal of the cover into said free space and provides access to the fuel assemblies. A rotating plug of this type is carried by the vault within which the reactor core is placed and is supported either directly or by means of a second shield plug which also rotates within the wall of the reactor vault and is disposed coaxially with the reactor core.

By reason of the size of the core cover and whatever method may be adopted for supporting the rotating shield plugs, the first shield plug which carries the cover must be displaced off-center to a substantial extent with respect to the reactor core and therefore with respect to the second shield plug. A substantial space must therefore be left free around said core for the displacement of the cover during refuelling. This makes it necessary to construct a reactor vessel which has very large dimensions with respect to the reactor core and in which the unused space during normal reactor operation is considerable.

The aim of this invention is to overcome the above-mentioned disadvantage by means of a nuclear reactor design in which the rotating shield plugs have relatively small diameters and only a small free space is provided around the reactor core whilst the shape and dimensions of the core cover remain normal.

The nuclear reactor in accordance with the invention which comprises a core cover, two rotatable shield plugs including an inner plug which supports the cover by means of an axial extension and is mounted eccentrically in the second rotating shield plug or so-called outer plug which is larger in diameter and disposed in coaxial relation to the reactor core, and a fuel-assembly handling flask mounted laterally with respect to said reactor core, is characterized in that the inner plug which is carried by said inner plug forms above the reactor core a lateral projection with respect to said plug, the rotation of the inner plug about its own axis being intended to expose part of the reactor core so as to permit handling of fuel assemblies within the core by means of an articulated handling arm which is carried by the outer plug.

The combination of the movement of the articulated arm which is carried by the outer plug and rotational movement of said plug ensure that handling of fuel assemblies which are placed in a number of different fuel channels is carried out in one orientation of the shield plugs with respect to one another thus makes it possible to leave part of the core surface free and to suspend the cover from the inner plug which is smaller in diameter than the outer plug. Moreover, the temperature-measuring devices and the like can readily be grouped together above the cover within the single inner plug despite the small diameter of this latter.

The different advantages and properties of the invention will be shown more clearly in the following description of one embodiment which is given by way of non-limitative example, reference being made to the single FIGURE of the accompanying drawing which is an axial sectional view of a nuclear reactor in accordance with the invention.

The nuclear reactor which is illustrated in this FIGURE is a fast reactor of the upward coolant flow type. In a reactor of this type, the core 1 is placed within a vessel 2 which is in turn surrounded by a concrete biological shield structure 4, the vessel 2 andd the concrete shield 4 being closed by a rotatable shield plug or outer plug 6 disposed in coaxial relation to the reactor core within which is rotatably mounted a second shield plug or inner plug 8 having a smaller diametrical dimension. The reactor core 1 proper is surrounded by a lateral blanket 14 having an external diameter which is substantially equal to that of the outer plug 6. A core cover 10 serves as a collector for all the instruments and devices which are intended for measurements or tests to be carried out on the fuel assemblies of the reactor core 1 as a lateral extension which as a result of rotation of the inner plug exposes part of the reactor core. Said cover 10 is supported on one side by an extension 9 of the inner plug 8, the diameter of said extension and of said inner plug being distinctly smaller than that of the cover and therefore of the reactor core. The external surfaces of these two elements, namely the extension 9 and cover 10, are preferably tangent to each other internally. Control rod guide tubes 12 and the drive mechanisms for these latter pass through the shield plugs 6 and 8, are spaced at intervals within each plug and are movable downwardly to enter rectilinear passageways 11 in the core cover 10 when in alignment therewith as seen for the right guide tube 12 in the drawing without any mechanical connection between said guide tubes and said passageways.

The outer shield plug 6 carries an extensible handling arm 20 in which articulated link-rods 21 adjust the position of a grappling system 22. The pivotal motion of said link-rods and consequently of the system 22 with respect to the arm in conjunction with the rotation of the shield plug 6 which carries said arm permits displacement of the fuel assemblies contained in the different core channels 18 and transfer of said fuel assemblies to or from a fuel-handling flask 24 which is parallel to said core channels but is placed outside the radial blanket 14. Said handling flask 24 is supported by a device 26 which is capable of moving within a discharge duct 28, said duct being secured within the top wall 4 or biological shield roof in proximity to but outside the outer shield plug 6.

During normal operation of the reactor, the core cover 10 is in the position shown in chain-dotted lines in the FIGURE, the passageway 11, the guide tubes 12 and the control-rod channels within the reactor being in aligned relation whilst the measuring instruments are each located in alignment with to a core channel 18 containing a fuel assembly and carried by the cover 10. When the inner plug 8 is driven in rotation about its axis 16, said plug causes a displacement of said cover 10 to a position of withdrawal which is shown in full lines in the FIGURE. Part of the core channels 18 which contain the fuel assemblies is exposed and consequently made readily accessible. As a result of rotation of the outer plug 6, the handling arm 20 can then be displaced above the reactor core within the space which has thus been freed and the grappling system 22 can be brought successively above each core channel 18 and then above the handling flask 24. Since said rotation of the outer plug 6 is accompanied by the rotation of the inner plug 8, all the core channels of the reactor can be serviced successively after a single rotation of the inner plug 8 with respect to the outer plug 6 through an angle of 180°.

When the fuel-assembly handling operations are completed, it is only necessary to cause a further pivotal movement of the inner plug 8 in order to replace the cover 10 above the reactor core and to re-position the guide tubes 12 opposite to the passageways 11 which form extensions of said tubes opposite to the corresponding channels within the reactor core 1. Similarly, the measuring and testing instruments are again located opposite to the corresponding fuel assemblies. The control rods can be lifted and the reactor can be put back into operation.

The reactor core 1 and the radial blanket 14 of this latter are surrounded within the reactor vessel 2 by a neutron shield which comprises a lateral wall 30 having a top shield extension which, in the embodiment shown, is disposed immediately above the core cover 10. This top shield is constituted by a plate 32 which is suspended from the outer plug 6 and penetrated by an opening 34 through which the extension 9 of the inner plug 8 is intended to pass. In addition, said top shield comprises a disc 36 which is contained within said extension 9 and rotates with this latter in the same manner as the plate 32 rotates with the outer plug 6. Finally, the plate 32 is penetrated by a radial passage 38 for the insertion of the extensible arm 20 which permits lateral movement of the grappling system 22 towards the core channels 18 and towards the handling flask 24. Refuelling operations can thus be carried out without either displacing or withdrawing the top shield elements 32, 36.

In some cases however, the lateral walls 30 of the neutron shield are extended above the handling arm 20 to a level in the vicinity of the concrete shield roof 4. The top wall of the neutron shield which is placed immediately beneath said concrete shield roof 4 is also constructed in two sections 32, 36 and each section to one of the shield plugs 6, 8; however, the radial passage 38 is dispensed with and the handling arm can be either of the extensible or rotating type. In this case the lateral wall 30 is transferred beyond the discharge duct 28 and handling flask 24 which are thus located within the interior of the shielding and the same applies to the handling arm 20. However, this shielding only surrounds the space which is strictly necessary for the handling elements, the lateral blanket and the reactor core.

Moreover, that portion of the core cover which projects on one side of the inner shield plug and is placed beneath the outer shield plug plays a part in guiding the control rod mechanisms and in supporting the different measuring instruments even while remaining free with respect to the outer plug. In fact, the measuring devices and the like lying within the reactor enclosure are placed within the core cover 10 in order to correspond to the positions of the core assemblies but are connected to the exterior of the reactor containment vault while traversing only the inner shield plug. Said devices can therefore be readily displaced, then moved back in position and centered on the core channels without entailing any need for disconnection. Similarly, the control rod guide tubes which are carried by the outer plug are cut-off and restored solely as a result of rotation of the inner plug after lifting of the control rod drive mechanisms. Preliminary disassembly operations involved prior to fuel handling as well as the operations required to restore the installation are therefore extremely few in number. In addition, lost space is reduced to a minimum and this is particularly important in reactors in which the heat exchangers are integrated within the reactor vessel and containment vault.

A number of different modifications could clearly be made in the embodiment which has just been described without thereby departing from the scope of the invention. By way of example, all the control rod guide tubes and drive mechanisms could be carried directly by the inner plug.

What we claim is :

1. A nuclear reactor comprising a core cover, two rotatable shield plugs including an inner plug which supports the cover by means of an axial extension and is mounted eccentrically within the second rotating shield plug or outer plug which is larger in diameter and disposed in coaxial relation to the reactor core, and a fuel-assembly handling flask mounted laterally on said outer plug above the reactor core, the inner plug having a smaller diameter than the reactor core and the cover forming above the reactor core a lateral projection with respect to said plug, the rotation of the inner plug about its own axis exposing part of the reactor core for handling of fuel assemblies within the core by means of an articulated handling arm carried by the outer plug, rotation of the cover by the inner plug moving the cover out of the axis of rotation of the outer plug.

2. A reactor according to claim 1, said reactor having around the core a neutron shield comprising a top wall extending above the reactor core, said wall being of two separate sections secured respectively to each of the two plugs.

3. A reactor according to claim 2, the neutron shield surrounding laterally the fuel-handling flask and the articulated handling arm.

4. A reactor according to claim 2, the top wall of the neutron shield being immediately above the core cover and having a radial passage for the displacement of the articulated handling arm.

5. A reactor according to claim 1, including a radial external surface for the axial extension and a radial external surface for the core cover, the external surface of the axial extension of the inner plug being internally tangent to the external surface of the core cover.

* * * * *